(12) United States Patent
Pandey et al.

(10) Patent No.: US 12,548,004 B2
(45) Date of Patent: Feb. 10, 2026

(54) SYSTEM AND METHOD FOR VISION-ASSISTED CHECKOUT

(71) Applicant: JIO PLATFORMS LIMITED, Ahmedabad (IN)

(72) Inventors: Naveen Kumar Pandey, Pratapgarh (IN); Balakrishna Pailla, Alto Porvarim (IN); Shailesh Kumar, Hyderabad (IN); Abhinav Anand, Bhopal (IN); Suman Choudhary, Bengaluru (IN); Divya Bhagwat, Mumbai (IN); Hemant Kashniyal, Hyderabad (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 91 days.

(21) Appl. No.: 18/028,552

(22) PCT Filed: Sep. 28, 2022

(86) PCT No.: PCT/IB2022/059232
§ 371 (c)(1),
(2) Date: Mar. 26, 2023

(87) PCT Pub. No.: WO2023/053026
PCT Pub. Date: Apr. 6, 2023

(65) Prior Publication Data
US 2024/0354731 A1 Oct. 24, 2024

(30) Foreign Application Priority Data
Sep. 28, 2021 (IN) .............................. 202121043965

(51) Int. Cl.
*G06T 7/62* (2017.01)
*G06Q 20/18* (2012.01)
(Continued)

(52) U.S. Cl.
CPC ........... *G06Q 20/208* (2013.01); *G06Q 20/18* (2013.01); *G06T 7/62* (2017.01); *G06V 20/52* (2022.01);
(Continued)

(58) Field of Classification Search
CPC .... G06Q 20/208; G06Q 20/18; G06Q 20/047; G06Q 20/201; G06Q 20/209;
(Continued)

(56) References Cited

U.S. PATENT DOCUMENTS 9,589,433 B1 * 3/2017 Thramann .............. G07G 3/003
10,262,293 B1  4/2019 Prater et al.
(Continued)

OTHER PUBLICATIONS

Mei-Yi Wu et al., "A Framework of Visual Checkout System Using Convolutional Neural Networks for Bento Buffet", Sensors, vol. 21, Apr. 8, 2021, Total Pages 20.
(Continued)

*Primary Examiner* — Timothy R Newlin
(74) *Attorney, Agent, or Firm* — Raj S. Dave; Dave Law Group LLC (57) ABSTRACT

This present disclosure proposes a system and method for providing a 3D computer vision-assisted frictionless self-checkout experience in a traditional retail store by using two RGB-D camera sensors and a conveyer belt. The disclosure provides a self-checkout counter (106) that enables a customer (102) to go through a self-service checkout process by simply placing the collected products one by one on a conveyer belt. One vertical and another horizontal RGB-D sensor (108) mounted in a housing frame attached towards the end of the conveyer belt capture RGB and depth image of each product passing through the housing and pass it to a product recognition engine (216). The engine (216) identifies the unique product along with its volumetric attributes processing the RGB-D data that is further compared with a
(Continued)

master product database and processed for invoicing. The customer wallet and payment may be integrated with the customer phone number at the self-checkout counter (106) for providing a completely automated checkout experience.

22 Claims, 7 Drawing Sheets

(51) Int. Cl.
    *G06Q 20/20*     (2012.01)
    *G06V 20/52*     (2022.01)
    *G06V 20/68*     (2022.01)
    *G06V 10/764*     (2022.01)
    *G06V 20/64*     (2022.01)

(52) U.S. Cl.
    CPC .... *G06V 20/68* (2022.01); *G06T 2207/10024* (2013.01); *G06T 2207/10028* (2013.01); *G06T 2207/20084* (2013.01); *G06T 2207/20212* (2013.01); *G06T 2207/30232* (2013.01); *G06T 2207/30242* (2013.01); *G06V 10/764* (2022.01); *G06V 20/64* (2022.01); *G06V 2201/09* (2022.01)

(58) Field of Classification Search
    CPC . G06Q 30/06; G06T 7/62; G06T 2207/10024; G06T 2207/10028; G06T 2207/20084; G06T 2207/20212; G06T 2207/30232; G06T 2207/30242; G06V 20/52; G06V 20/68; G06V 10/764; G06V 20/64; G06V 2201/09; G06V 10/255; G06V 10/811; G07G 1/0036; G07G 1/0045; G07G 5/00
See application file for complete search history.

(56) References Cited

U.S. PATENT DOCUMENTS

| | | | | |
|---|---|---|---|---|
| 11,481,751 | B1* | 10/2022 | Chaubard | G06V 10/82 |
| 2012/0254166 | A1* | 10/2012 | Agarwal | G06Q 10/107 |
| | | | | 707/E17.084 |
| 2016/0104019 | A1* | 4/2016 | Todeschini | G06K 7/1426 |
| | | | | 235/472.01 |
| 2016/0188942 | A1* | 6/2016 | Good | G06K 7/10792 |
| | | | | 235/462.21 |
| 2016/0300361 | A1* | 10/2016 | Xie | G06T 7/246 |
| 2016/0350931 | A1* | 12/2016 | Costello | G06Q 20/208 |
| 2017/0083884 | A1* | 3/2017 | Vilmosh | G06V 10/751 |
| 2018/0314877 | A1* | 11/2018 | Srivastava | G06V 20/64 |
| 2019/0065823 | A1* | 2/2019 | Srivastava | G06V 20/653 |
| 2019/0236531 | A1* | 8/2019 | Adato | G06F 16/583 |
| 2019/0333039 | A1* | 10/2019 | Glaser | G06Q 20/202 |
| 2020/0074432 | A1 | 3/2020 | Valdman et al. | |
| 2021/0350561 | A1* | 11/2021 | Nishi | G06T 7/543 |
| 2022/0076015 | A1* | 3/2022 | Lee | G06F 18/214 |

OTHER PUBLICATIONS

Yuchen Wei et al., "Deep Learning for Retail Product Recognition: Challenges and Techniques", Computational Intelligence and Neuroscience, vol. 2020, p. 1-23, Nov. 12, 2020, Total Pages 23.

Hongfa Wen et al., "Dynamic Selective Network for RGB-D Salient Object Detection", IEEE Transactions on Image Processing, vol. 30, p. 9179-9192, Nov. 5, 2021, Total Pages 14.

International Search Report, PCT/IB2022/059232, Dec. 28, 2022, Total Pages 03.

* cited by examiner

SYSTEM AND METHOD FOR VISION-ASSISTED CHECKOUT

CROSS-REFERENCE TO RELATED APPLICATION(S)

This application is a National Stage of International Application No. PCT/IB2022/059232, filed on Sep. 28, 2022, which claims priority to Indian patent application Ser. No. 20/212,1043965, filed Sep. 28, 2021, the disclosures of which are hereby incorporated by reference in their entirety.

TECHNICAL FIELD

The present disclosure relates to a method and a system for providing Three-Dimensional (3D) computer vision-assisted self-service checkout, and more particularly, to a method and system for providing 3D computer vision-assisted self-service checkout in traditional retail stores using Red Green Blue-Depth (RGB-D) sensors.

BACKGROUND

Retail has come a long way from the first brick-and-mortar stores to global retail chains that seek to leverage smart technologies to add value to their operations. Despite all these advances, the checkout experience is still the Achilles heel of retail stores. Traditionally, a checkout requires store executives to attend to the customer at the checkout terminal, manually scan the products for billing, and process the payments. The process requires extensive manual labour, is constrained by human efficiency, and is extremely sensitive to errors, making it way slow and expensive to scale. It's not surprising that half the customers are ready to abandon their shopping carts due to long checkout queues.

The existing executive-assisted manual checkout experience in retail stores is plagued with the following issues: manual scanning of each product for billing results in a lower number of customers served per hour i.e. a higher cost of operation to run each store, extensive, inefficient, and error-prone manual labour results in longer waiting queues, making up for a frustrating customer experience that results in reduced customer repeatability and scaling to serve a higher number of customers per unit of time in each store requires hiring additional skilled manual labour and keeping them on the payroll even for non-spike times, overshooting the operational budget estimated to run each store.

One existing inefficient solution provides a system comprising a 2D camera for capturing imagery of packaged items where the packaged items include digital watermarking printed on product packaging. Multiple processors are programmed to prioritize at least some image areas from within at least one captured imagery frame for digital watermark detection based on: (i) area brightness and on ii) area frame location; and detecting digital watermarks from one or more image areas prioritized from the prioritizing image areas, in which the detecting digital watermarks analyses image areas in order of prioritization.

Another existing solution is focused on tracking the retail products and not on recognizing their class along with the volume. The retail products are tracked and extracted hand-crafted features such as weight, shape, colour, surface force image, position, or conductivity are extracted. Further, a machine-learning model is used for establishing an identity of the product item based on the extracted features. Differently, in this solution, a deep learning architecture based on RGB-D images and 3D convolutions for product and volume classification is used.

Further, another available solution discloses an automated object recognition mechanism at checkout at a retail kiosk. In addition, a system and method are provided for computer vision (CV) driven applications within an environment of a preferred embodiment function to seamlessly monitor, track, and account for objects within an observed space.

Hence there is a need in the art, to replace the traditional human-supervised checkout experience with a computer vision assisted frictionless self-checkout experience that enables the business teams to simplify and scale checkouts with minimal human supervision by providing a 3D computer vision assisted self-service checkout system.

OBJECTS OF THE PRESENT DISCLOSURE

It is an object of the present disclosure to provide a 3D computer vision-assisted self-service checkout service to a customer.

It is an object of the present disclosure to provide a cost-effective self-service checkout service comprising a conveyer belt and 2 RBG-D cameras.

It is an object of the present disclosure to provide an operationally and logistically convenient self-service checkout service.

It is an object of the present disclosure to provide a self-service checkout service that is infinitely scalable and completely automated thereby eliminating the need for hiring skilled professionals for manual labour.

It is an object of the present disclosure to provide the self-checkout service having a human-level product recognition with a high degree of certainty in a constant time for each product. The constant time product recognition makes the checkout process a linear function of items selected by the customer.

It is an object of the present disclosure to provide the self-checkout service having a predictable and significantly faster turnaround time for each customer.

It is an object of the present disclosure to provide the self-checkout service that enables a hassle-free experience requiring no self-scanning or executive-assisted scanning leading to a faster checkout time resulting in customer delight.

It is an object of the present disclosure to replace the traditional human-supervised checkout experience with a computer vision-assisted frictionless self-checkout experience that enables business teams to simplify and scale checkouts with minimal human supervision.

It is an object of the present disclosure to decrease the purchase abandonment rate.

It is an object of the present disclosure to provide reduced operational costs due to the reduction of staff required for billing and checkout.

It is an object of the present disclosure to increase the number of customers served per hour in each store i.e., increased revenue per store.

It is an object of the present disclosure to provide improvement in overall customer experiences and store attendance.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for providing a computer vision assisted self-service checkout. The system captures RGB and depth images of one or more products at a first timestamp using one or more Red Green Blue Depth (RGB-D) sensors. The one or more RGB-D sensors are mounted in an RGB-D housing frame. The one or more RGB-D sensors (212) may be a phone camera or a hand-held camera mounted in an RGB-D housing frame. The RGB-D housing frame comprises a 2×2 meter rectangular framework walled at three sides and provided with diffused lighting forming an upside-down U-shaped tunnel. The RGB-D housing frame is configured proximate to a conveyor belt.

Further, the system combines the captured RGB and depth images to create a unified payload for the one or more products at the first timestamp. Further, the system performs a volumetric analysis to distinguish the one or more products that are visually similar but volumetrically different. The volumetric analysis is performed using a two-stream Convolutional Neural Network (CNN) approach. Further, the system determines a count of the one or more products based on the unified payload of the one or more products. Further, the system generates a unique product ID of each of the one or more products. The unique product ID comprises a brand logo, a net weight, a Maximum Retail Price (MRP), a vegetation logo, a Food Safety and Standards Authority of India (FSSAI) mark, a Food Process Order (FPO) certification mark, and a license number of the one or more products. The unique product ID is generated by aggregating a brand logo, a net weight, a Maximum Retail Price (MRP), a vegetation logo, a Food Safety and Standards Authority of India (FSSAI) mark, a Food Process Order (FPO) certification mark, and a license number of the one or more products by a decision heuristics approach.

Further, the system identifies a Stock Keeping Unit (SKU) of the one or more products based on the unique product ID of each of the one or more products. Furthermore, the system generates an invoice bill for the one or more products based on the identified SKU of the one or more products. The SKU of the one or more products is identified using a product registration database. The product registration database comprises the unique product id mapped with the SKU of the one or more products created during product registration. The SKU of the one or more products is identified by performing a reverse search in the product registration database.

In an aspect, the present disclosure provides a method for providing a computer vision assisted self-service checkout. The method includes capturing RGB and depth images of one or more products at a first timestamp using one or more Red Green Blue Depth (RGB-D) sensors, the one or more RGB-D sensors are mounted in an RGB-D housing frame. The one or more RGB-D sensors (212) may be a phone camera or a hand-held camera mounted in an RGB-D housing frame. The RGB-D housing frame comprises a 2×2 meter rectangular framework walled at three sides and provided with diffused lighting forming an upside-down U-shaped tunnel. The RGB-D housing frame is configured proximate to a conveyor belt.

Further, the method includes combining the captured RGB and depth images to create a unified payload for the one or more products at the first timestamp. Further, the method includes performing a volumetric analysis to distinguish the one or more products that are visually similar but volumetrically different. The volumetric analysis is performed using a two-stream Convolutional Neural Network (CNN) approach. Further, the method includes determining a count of the one or more products based on the unified payload of the one or more products. Further, the method includes generating a unique product ID of each of the one or more products. The unique product ID comprises a brand logo, a net weight, a Maximum Retail Price (MRP), a vegetation logo, a Food Safety and Standards Authority of India (FSSAI) mark, a Food Process Order (FPO) certification mark, and a license number of the one or more products. The unique product ID is generated by aggregating a brand logo, a net weight, a Maximum Retail Price (MRP), a vegetation logo, a Food Safety and Standards Authority of India (FSSAI) mark, a Food Process Order (FPO) certification mark, and a license number of the one or more products by a decision heuristics approach.

Further, the method includes identifying a Stock Keeping Unit (SKU) of the one or more products based on the unique product ID of each of the one or more products. Furthermore, the method includes generating an invoice bill for the one or more products based on the identified SKU of the one or more products. The SKU of the one or more products is identified using a product registration database. The product registration database comprises the unique product id mapped with the SKU of the one or more products created during product registration. The SKU of the one or more products is identified by performing a reverse search in the product registration database.

In an aspect, the present disclosure provides a user equipment (UE) for providing a computer vision assisted self-service checkout. The user equipment captures RGB and depth images of one or more products at a first timestamp using one or more Red Green Blue Depth (RGB-D) sensors. The one or more RGB-D sensors may be a phone camera or a hand-held camera mounted in an RGB-D housing frame. Further, the user equipment sends the captured RGB and depth images to the system, wherein the system further. Further, the user equipment combines the captured RGB and depth images to create a unified payload for the one or more products at the first timestamp. Further, the user equipment determines a count of the one or more products based on the unified payload of the one or more products. Further, the user equipment generates a unique product ID of each of the one or more products. Further, the user equipment identifies a Stock Keeping Unit (SKU) of the one or more products based on the unique product ID of each of the one or more products. Further, the user equipment generates an invoice bill for the one or more products based on the identified SKU of the one or more products. Furthermore, the user equipment displays the invoice bill for the one or more products based on the identified SKU for the self-service checkout.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

RGB-D sensors are specific types of depth-sensing devices that work in association with an RGB (red, green, and blue color) sensor camera. RGB-D sensors can augment the conventional image with depth information (related to the distance to the sensor) on a per-pixel basis. The present disclosure relates to a method and system for providing 2D, 3D, and 4D computer vision-assisted self-service checkout, and more particularly, to a method and system for providing 2D. 3D, and 4D computer vision-assisted self-service checkout in traditional retail stores using RGB-D sensors. The disclosure enables product recognition using a combination of retail 3D product classification on RGB-D images and multi-attribute (textual and graphical elements) extraction from retail RGB images using a Dual Stream Late Fusion CNN on RGB-D images.

Retail checkout automation may relate to a broader field of computation perception and robotics and a more specific subfield of retail Artificial Intelligence (AI). Retail checkout automation aims at improving operational efficiency while optimizing the operational cost of retail stores to provide a delightful experience to customers. In retail stores, there is always a focused effort to enable customers to quickly find what they're looking for, get help when they need it, and provide fast checkout. The AI-enabled automation and personalization mechanism streamlines these activities to help create more satisfying customer experiences.

Figure 1:
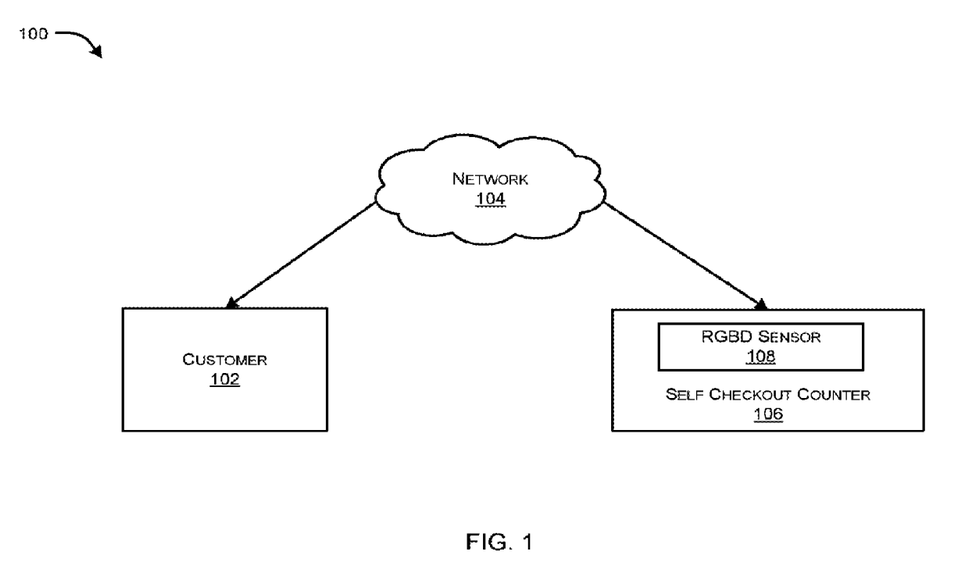
FIG. 1 illustrates exemplary architecture (100) in which or with which proposed system may be implemented, in accordance with an embodiment of the present disclosure.

FIG. 1 illustrates an exemplary architecture (100) in which or with which the proposed system that is a self-checkout counter (106) may be implemented, in accordance with an embodiment of the present disclosure. As illustrated in FIG. 1, a customer (102) may be a part of the self-checkout counter (106) while purchasing products at a retail or a wholesale outlet. One computing device of the customer (102) may be connected to a central server (104). The central server (104) may be a physically located database at a remote location or may be a remote database provided as a cloud service. Upon the customer (102) placing products to be purchased on a conveyer belt of the self-checkout counter (106), a 2D, 3D, or 4D computer vision-assisted frictionless self-checkout experience may be activated. After selecting the products, the self-checkout counter (106) may enable the customers to go through a self-service checkout process by simply placing the collected products one by one on a conveyer belt.

In an embodiment, two RGB-D sensors (108) may be mounted in a housing frame attached towards the end of the conveyer to capture the RGB and depth image of each product passing through the housing frame. The one or more RGB-D sensors (212) may be a phone camera or a hand-held camera mounted in an RGB-D housing frame. The conveyer belt may pass the products to a product recognition engine at the self-checkout counter (106). The product recognition engine may identify the unique product along with its volumetric attributes by processing RGB-D data. The product recognition engine may further compare the RGB-D data with a master product database and then use the RGB-D data for invoicing. A customer wallet for payment and a customer phone number may be integrated with the self-checkout counter (106) for a completely automated checkout experience.

FIG. 1 further provides a clear depiction of the user equipment for providing a computer vision assisted self-service checkout is disclosed. The user equipment captures RGB and depth images of one or more products at a first timestamp using one or more Red Green Blue Depth (RGB-D) sensors (212). The one or more RGB-D sensors (212) may be a phone camera or a hand-held camera mounted in an RGB-D housing frame. Further, the user equipment sends the captured RGB and depth images to the system, wherein the system further. Further, the user equipment combines the captured RGB and depth images to create a unified payload for the one or more products at the first timestamp. Further, the user equipment determines a count of the one or more products based on the unified payload of the one or more products. Further, the user equipment generates a unique product ID of each of the one or more products. Further, the user equipment identifies a Stock Keeping Unit (SKU) of the one or more products based on the unique product ID of each of the one or more products. Further, the user equipment generates an invoice bill for the one or more products based on the identified SKU of the one or more products. Furthermore, the user equipment displays the invoice bill for the one or more products based on the identified SKU for the self-service checkout.

Figure 2:
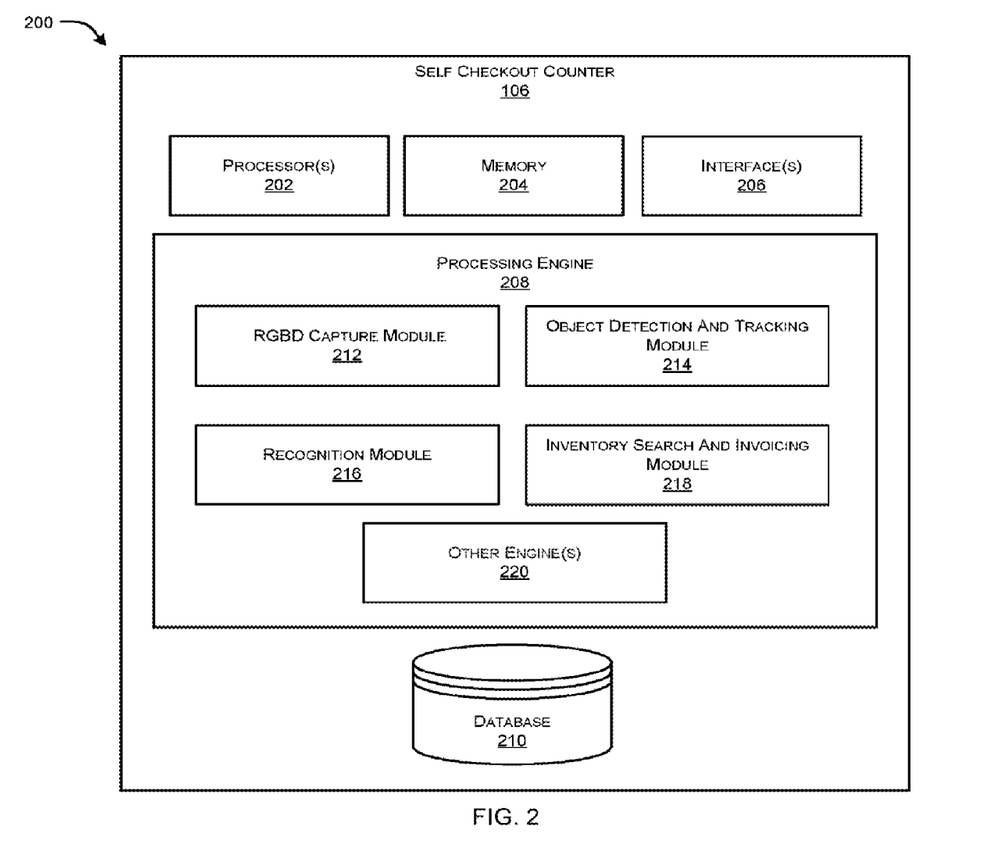
FIG. 2 illustrates an exemplary representation (200) of a self-checkout counter (106) for computer vision assisted self-service checkout, in accordance with an embodiment of the present disclosure.

In an exemplary embodiment (200), and as shown in FIG. 2, the self-checkout counter (106), can include one or more processors (202) coupled with a memory (204). The memory (204) may store instructions which when executed by the one or more processors (202) may cause the self-checkout counter (106), to perform one or more functions.

In an embodiment, digital twins (3D models) of the retail products (both rigid and non-rigid products) may be created by using an automated config-driven pipeline and a simulation engine. A synthetic generation pipeline may be used to render millions of realistic synthetic RGB-D (colour and depth) images and JSON files with corresponding (automatic) annotations (bounding boxes, polygons, segmentation masks, etc.) while training Artificial Intelligence (AI), Machine Learning (ML), and CV models for domain-specific tasks. The trainings may be done using a set of executable set of instructions to be executed at the processor (202) of the self-checkout counter (106).

In an embodiment, the self-checkout counter (106) may use the RGB-D data captured by Real Sense cameras which only use RGB images. The additional depth data along with the RGB data may help to better formulate the product recognition engine and improve the recognition accuracy of the self-checkout counter (106). The self-checkout counter (106) may incorporate 2D, 3D, or 4D convolutions-based deep learning architecture for training ML models for volume classification of retail products.

The one or more processors (202) may be implemented as one or more microprocessors, microcomputers, microcontrollers, digital signal processors, central processing units, logic circuitries, and/or any devices that manipulate data based on operational instructions. Among other capabilities, the one or more processor(s) (202) may be configured to fetch and execute computer-readable instructions stored in a memory (204) of the self-checkout counter (106). The memory (204) may store one or more computer-readable instructions or routines, which may be fetched and executed to create or share the data units over a network service. The memory (204) may comprise any non-transitory storage device including, for example, volatile memory such as RAM, or non-volatile memory such as EPROM, flash memory, and the like.

The self-checkout counter (106) may also comprise an interface(s) (206). The interface(s) (206) may comprise a variety of interfaces, for example, interfaces for data input and output devices, referred to as I/O devices, storage devices. Supervisory Control and Data Acquisition (SCADA), sensors, and the like. The interface(s) (206) may facilitate communication of the self-checkout counter (106) with various devices coupled to it. The interface(s) (206) may also provide a communication pathway for one or more components of the self-checkout counter (106) such as processing engines (208) and a database (230).

The one or more processors (202) may be implemented as a combination of hardware and programming (for example, programmable instructions) to implement one or more functionalities of the one or more processors (202). In examples described herein, such combinations of hardware and programming may be implemented in several different ways. For example, the programming for the one or more processors (202) may be processor-executable instructions stored on a non-transitory machine-readable storage medium and the hardware for the one or more processors (202) may comprise a processing resource (for example, one or more processors), to execute such instructions. In the present examples, the machine-readable storage medium may store instructions that, when executed by the processing resource, implement the one or more processors (202). In such examples, the self-checkout counter (106) may comprise the machine-readable storage medium storing the instructions and the processing resource to execute the instructions, or the machine-readable storage medium may be separate but accessible to the self-checkout counter (106) and the processing resource. In other examples, the one or more processors (202) may be implemented by electronic circuitry. In an aspect, the database (230) may comprise data that may be either stored or generated as a result of functionalities implemented by any of the components of the processor (202) or the processing engines (208).

In an exemplary embodiment, the processing engine(s) (208) of the self-checkout counter (106) may include an RGB-D Capture Module (212), an Object Detection and Tracking module (214), a Recognition module (216), an Inventory Search and Invoicing module (218) and other engines (220). The other engines (220) may further include, without limitation, a data receiving engine, a storage engine, a computing engine, or a signal generation engine.

In an implementation, the self-checkout counter (106) can be accessed by applications residing on any operating system, including but not limited to, Android™, iOS™, and the like. Examples of the self-checkout counter (106) can include but are not limited to, a portable computer and a laptop. The self-checkout counter (106) can include one or more input devices connected thereto, wherein the input device can include a touchpad, touch-enabled screen that may form a part of the self-checkout counter (106). In another embodiment, the input device connected to the self-checkout counter (106) can be in the form of an externally connected device or peripheral device including, but not limited to, a keyboard, a mouse, and the like. The self-checkout counter (106) may also include an interface, which may have a display.

In an embodiment, the RGB-D capture module (212) may continuously capture the RGB-D frames from both cameras. Further, the RGB-D and depth frames captured from both cameras at a same timestamp may be combined to create a unified payload for the same timestamp for further processing.

In an embodiment, the object detection and tracking module (214) may take the unified payload from the RGB-D capture module (212) and employ object detection and tracking algorithms (a modified version of depth Deep SORT algorithm) to track and count the objects passing through the tunnel. For a uniquely tracked object, the object detection and tracking module (214) may output a unique track ID, RGB and depth images of the uniquely tracked object, and a location of the uniquely tracked object in the RGB image frame.

In an embodiment, the recognition module (216) may take the RGB and depth images from the camera sensors of the uniquely tracked object from the object detection and tracking module (214). Further, the recognition module (216) may make use of various submodules to extract properties of retail products and uniquely identify the product.

In an embodiment, the inventory search and invoicing module (218) may take the unique track ID obtained from the recognition module (216) as input and identify the Stock Keeping Unit (SKU) of the uniquely tracked object. The SKU may be identified from a mapping database of product IDs with SKUs registered in the self-checkout counter (106) during product registration. Further, the inventory search and invoicing module (218) may perform billing/invoicing to add the product to the customer's bill.

Figure 3:
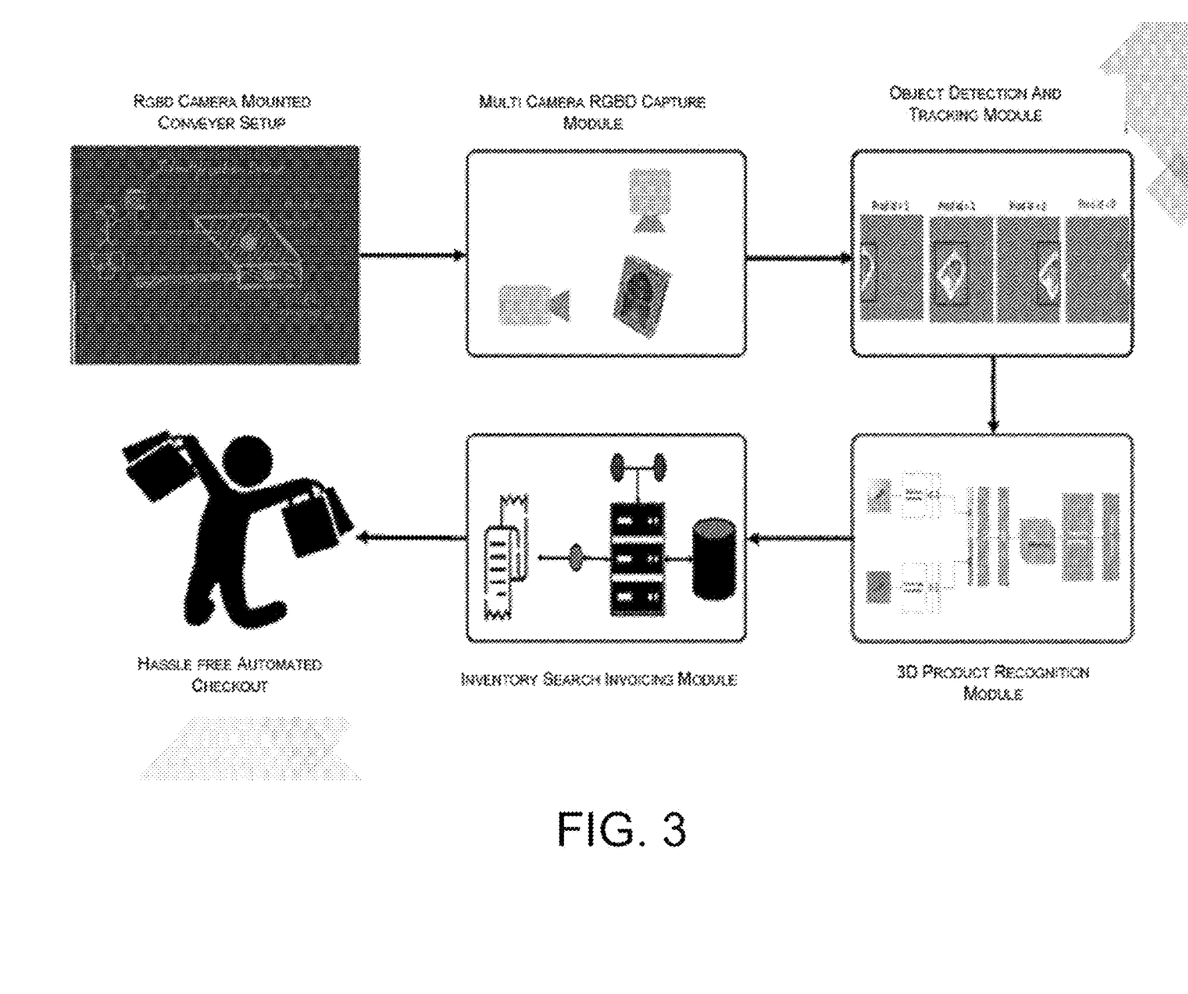
FIG. 3 illustrates an exemplary representation (300) of key components associated with the proposed system, in accordance with an embodiment of the present disclosure.

FIG. 3 illustrates an exemplary representation (300) of key components associated with the self-checkout counter (106), in accordance with an embodiment of the present disclosure. As illustrated, the self-checkout counter (106) comprises the RGB-D cameras (108) mounted on the conveyor belt, the multi-camera RGB-D capture module (212), the object detection and tracking module (214), the 3D product recognition module (216), the inventory search and invoicing module (218), and the automated checkout module. The RGB-D cameras (108) mounted on the conveyor belt may include multiple, for example, two RGB-D cameras mounted (for example, one on a horizontal side and another on a vertical top) in a 2×2 meter rectangular housing frame that may be placed at an end of the conveyor belt.

In an embodiment, the housing frame may be walled at three sides at the top, left, and right side touching the sides of the conveyer belt. Further, the housing frame may be provided with diffused lighting to create an upside-down U-shaped tunnel through which an object placed on the conveyer belt by the customer may pass. The tunnel may act as a field of view for the RGB-D cameras (108). There may also be an identification device attached to the conveyor belt that allows the customer (102) to be uniquely identified by the means of any of a phone number, a PIN/FaceId/NFC of the customer (102) as registered in the store.

In an embodiment, the multi-camera RGB-D capture module (212) may continuously capture the RGB-D frames from both RGB-D cameras and combine the RGB-D and depth frames captured from both cameras at the same timestamp to create a unified payload for the timestamp for further processing.

In an embodiment, the object detection and tracking module may take the unified input payload from the camera capture module and may employ object detection and tracking algorithms to track and count the objects passing through the tunnel. For each uniquely tracked object, it may output a track id, object's RGB and depth images and object's location in the RGB image frame.

Figure 4:
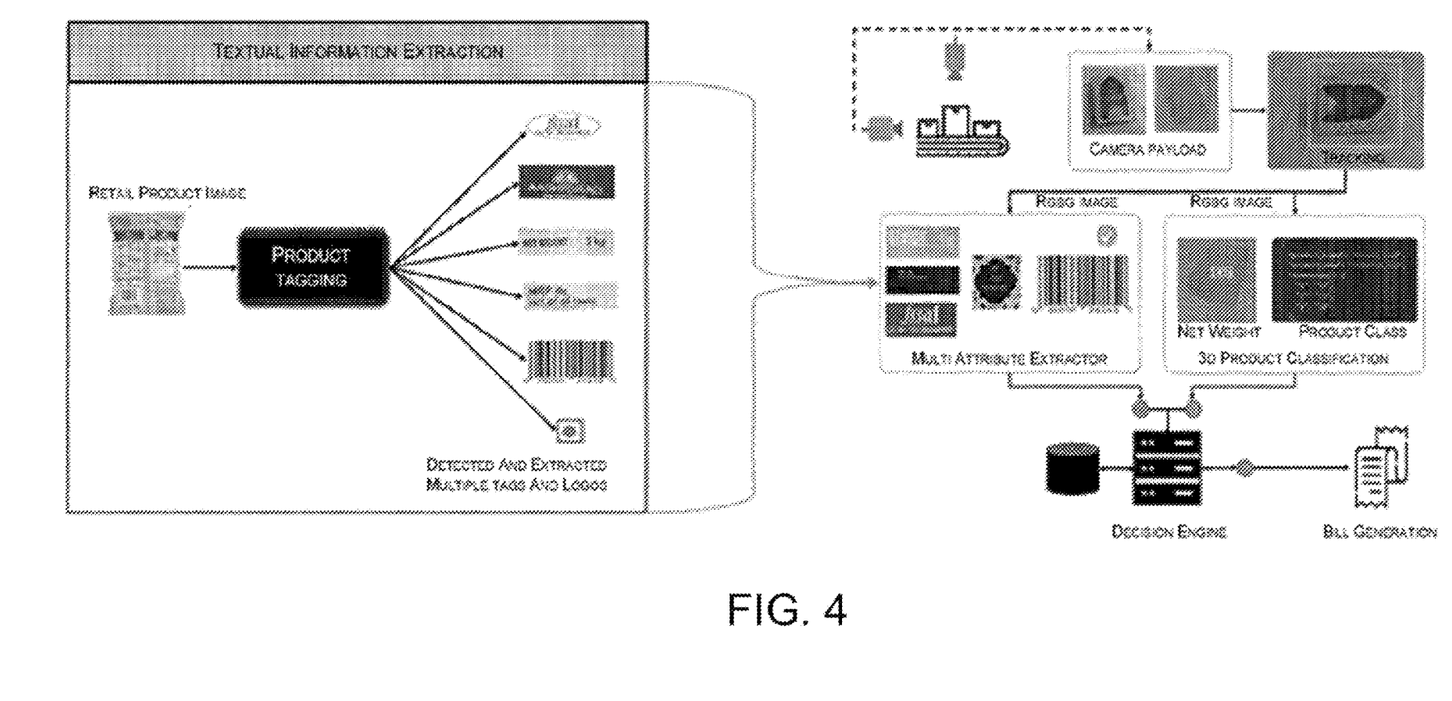
FIG. 4 illustrates an exemplary representation (400) of a 3D product recognition module of the system in accordance with an embodiment of the present disclosure.

FIG. 4 illustrates an exemplary representation (400) of the 3D product recognition engine (216) of the system in accordance with an embodiment of the present disclosure. The 3D product recognition engine (216) may take the RGB and depth images from the camera sensors (108) for each unique product tracked by the object detection and tracking module (214). Further, the 3D product recognition engine (216) may make use of the various submodules to extract properties of the retail product and uniquely identify the product.

Figure 5:
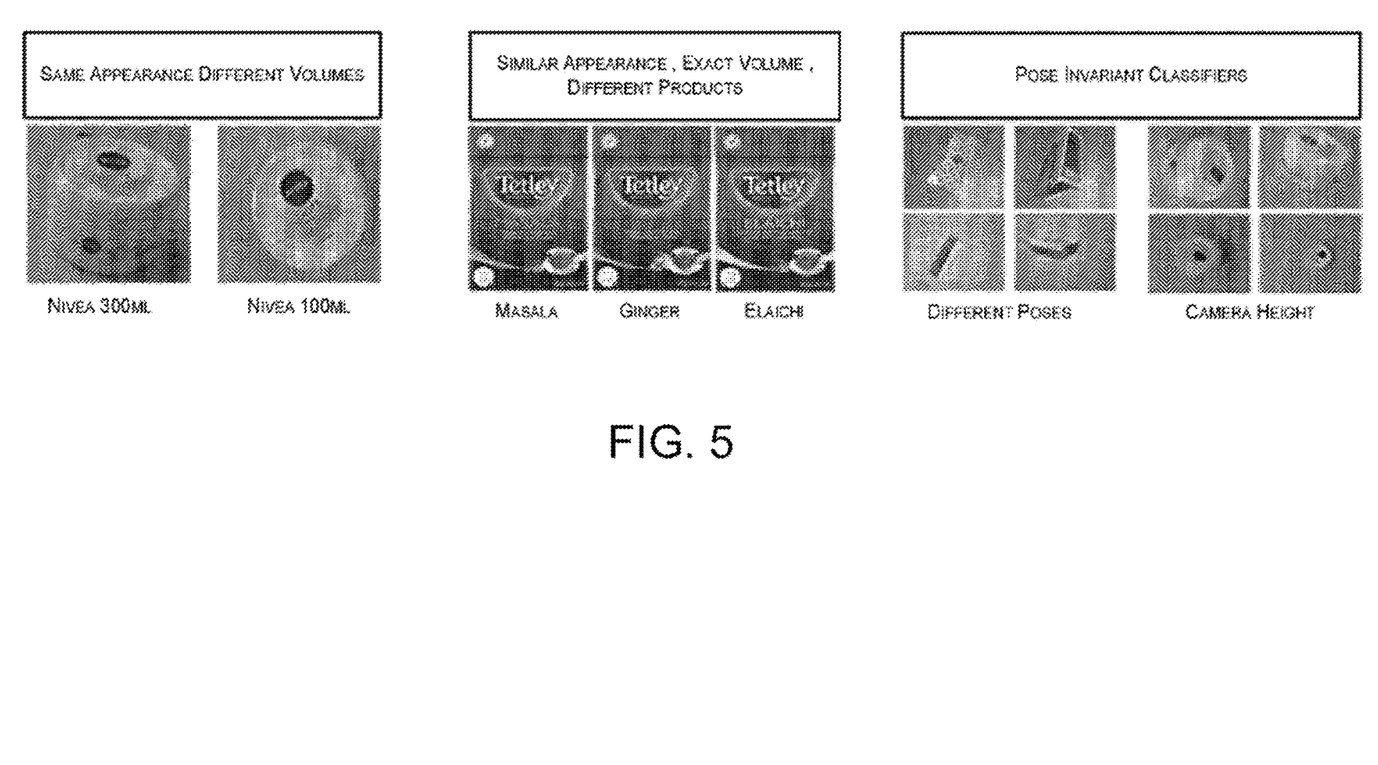
FIG. 5 illustrates an exemplary representation (500) of a 3D product classification module, in accordance with an embodiment of the present disclosure.

FIG. 5 illustrates an exemplary representation (500) of a 3D product classification module, in accordance with an embodiment of the present disclosure. The 3D product classification module may employ a neural network that may take two images—an RGB image and a depth image of the product from the RGB-D camera sensor (108). The 3D product classification module may then output a product label containing information related to brand, name, and volumetric dimensions i.e., width, height, and length. The 3D product classification module may be able to discriminate between two products that have similar visual appearance but distinct volumetric dimensions.

In an aspect, a multi-attribute extraction module may take an RGB image as input and may employ a combination of ML models to identify significant textual and graphical attributes of the retail product from the image. More specifically, the multi-attribute extraction module may specify retail product properties such as Brand Logo, Net Weight, Maximum Retail Price (MRP), Vegetation Logo, Food Safety and Standards Authority of India (FSSAI) Mark, FSSAI License Number, FPO Mark, and FPO License Number and so forth from the retail products image.

In an aspect, a decision module may make use of the information extracted by the multitask 3D product classification module and multi-attribute extraction module to uniquely identify the retail product and output its product id. A higher priority may be given to the higher confidence threshold outputs from the previous modules while making the decision.

After execution of the above-mentioned modules, a hassle-free automated checkout service may be provided to the customer (102) by the self-checkout counter (106).

In an embodiment, the 3D computer vision-assisted automated self-checkout counter (106) may enable a customer (102) to use an identification device integrated with the conveyer belt to self-identify and start the checkout process. When the customer places the items one by one on the conveyer belt and it goes through the two RGB-D camera-mounted housing placed over the conveyer belt (further referenced as 'tunnel'), the multi-camera capture engine (212) may capture the view inside the tunnel from both the RGB-D cameras, aggregate the RGB and depth images in a unified payload and send the unified payload to the object detection and tracking module (214). Further, the object detection and tracking module (214) may track the product as the product enters the field of view of the tunnel, assign a track ID and pass the RGB and depth images associated with the unique track ID to the 3D product recognition engine (216) once the object goes out of the field of view of the tunnel.

As a next step, the product recognition engine (216) may extract the best RGB-D images from each track ID passed by the object detection and tracking module (214) and may send it parallelly to the multi-attribute extraction module and the 3D product classification module with the track ID. Further, the multi-attribute extraction module may employ a multitask network to extract all the textual and graphical retail product markers like brand logos/barcodes/vegetation markers/FSSAI license Marker etc. from the RGB images for each track ID. Next, the multi-attribute extraction module may send it to the product recognition decision module (216).

In an embodiment, the 3D product classification module may take the RGB and depth images as input and may output the product class with its volumetric label for each track id and send it to the product recognition decision module. The decision module aggregates all the attributes extracted from both the upstream module for each track id and may apply decision heuristics to uniquely output the product identifier corresponding to the track ID. This module may send the product identifier to the inventory and invoicing module for further processing.

In yet another embodiment, the inventory query and invoicing module may perform a reverse search in its product registration database for the product identifier obtained by the 3D product recognition system to identify the SKU of the product. The inventory query and invoicing module may communicate to the invoicing system with the SKU of the product to add it to current customer's invoice. Once the customer signals the checkout by means of the identification device attached to the conveyer, a bill may be generated for the user by the invoicing module. Additionally, payment may be processed by the customer's preferred method of touchless payment like wallet/credit cards/Apple Pay/Google Pay/Samsung Pay/UPI and so forth.

Figure 6:
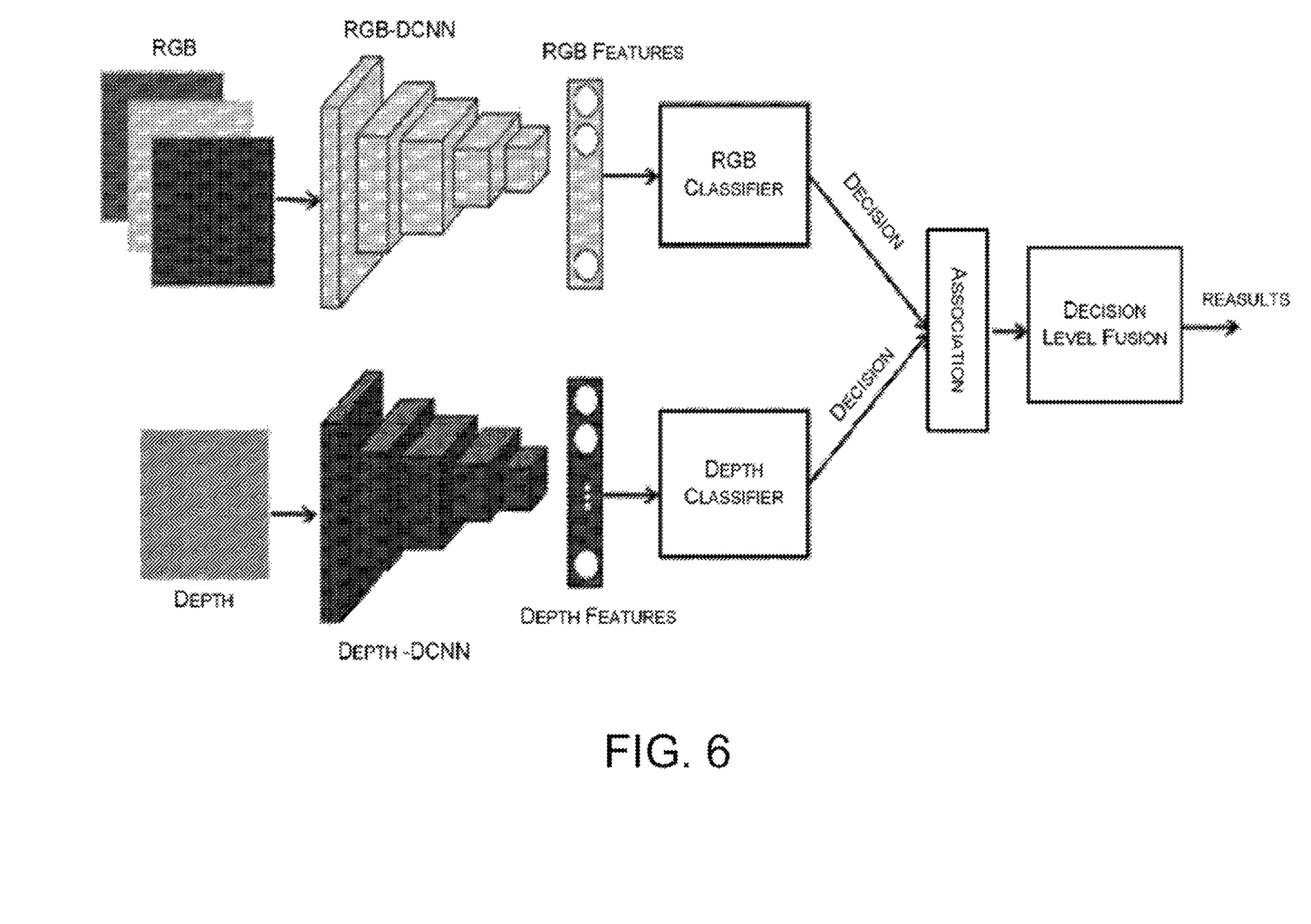
FIG. 6 illustrates an exemplary representation (600) of are tail 3D product classification mechanism using a dual stream late fusion CNN on RGB-D images, in accordance with an embodiment of the present disclosure.

FIG. 6 illustrates an exemplary representation (600) of a retail 3D product classification mechanism using a dual stream late fusion Convolutional Neural Networks (CNNs) on RGB-D images, in accordance with an embodiment of the present disclosure. The retail 3D product classification mechanism may take advantage of the massive representational power of the dual stream late fusion CNNs to directly discriminate between visually similar but volumetrically different retail products using a single RGB-D image frame. Instead of using inherently complex and computationally expensive volumetric analysis process that use 3D object priors or multiple images from different viewpoints to first reconstruct 3D object voxels and meshes and then perform further classification, the self-checkout counter (106) allows computationally inexpensive discrimination between objects based on both visual and volumetric features. The self-checkout counter (106) may use the dual stream CNN mechanism to individually compute features for the RGB image as well as the depth image and then jointly learn the object discrimination over both the feature vectors fused.

Figure 7:
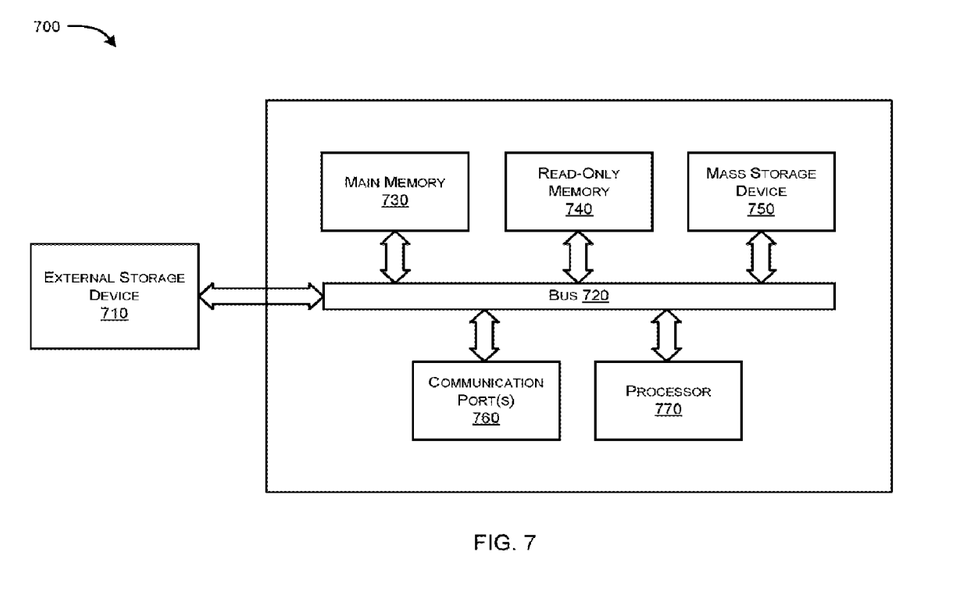
FIG. 7 illustrates an exemplary computer system (700) in which or with which embodiments of the present invention can be utilized in accordance with embodiments of the present disclosure.

FIG. 7 illustrates an exemplary computer system (700) in which or with which embodiments of the present disclosure can be utilized in accordance with embodiments of the present disclosure. As shown in FIG. 7, the computer system (700) can include an external storage device (710), a bus (720), a main memory (730), a read-only memory (740), a mass storage device (770), a communication port (760)), and a processor (770)). A person skilled in the art will appreciate that the computer system (700) may include more than one processor and communication ports. Examples of the processor (770)) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (770)) may include various modules associated with embodiments of the present invention.

The communication port (780) can be any of an RS-232 port for use with a modem-based dialup connection, a 10/100 Ethernet port, a Gigabit or 10 Gigabit port using copper or fiber, a serial port, a parallel port, or other existing or future ports. The communication port (780) may be chosen depending on a network, such as a Local Area Network (LAN), Wide Area Network (WAN), or any network to which the computer system (700) connects. The memory (730) can be Random Access Memory (RAM), or any other dynamic storage device commonly known in the art. The read-only memory (740) can be any static storage device(s) e.g., but not limited to, a Programmable Read Only Memory (PROM) chips for storing static information e.g., start-up or BIOS instructions for the processor (770). The mass storage (750) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays), available from various vendors.

The bus (720) communicatively couples the processor(s) (770) with the other memory, storage, and communication blocks. The bus (720) can be, e.g., a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects processor (770) to the computer system (700).

Optionally, operator and administrative interfaces, e.g., a display, keyboard, joystick and a cursor control device, may also be coupled to the bus (720) to support direct operator interaction with a computer system. Other operator and administrative interfaces can be provided through network connections connected through the communication port (760). The external storage device (710) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides a 3D computer vision-assisted self-checkout service to a customer.

The present disclosure provides a cost-effective self-service checkout service comprising a conveyer belt and 2 RBGD cameras.

The present disclosure provides an easy to operationalize and logistically convenient self-service checkout service.

The present disclosure provides 3D computer vision-assisted self-checkout service that is infinitely scalable and completely automated thereby eliminating a need for hiring skilled professionals for manual labour.

The present disclosure provides the self-checkout service having a human-level product recognition with a high degree of certainty in a constant time for each product. The constant time product recognition makes the checkout process a linear function of items selected by the customer.

The present disclosure provides the self-checkout service having a predictable and significantly faster turnaround time for each customer.

The present disclosure provides the self-checkout service that enables a hassle-free experience requiring no self-scanning or executive assisted scanning leading to a faster checkout time resulting in customer delight.

The present disclosure provides a mechanism to replace the traditional human supervised checkout experience with a computer vision assisted frictionless self-checkout experience that enables the business teams to simplify and scale checkouts with minimal human supervision.

The present disclosure enables to decrease purchase abandonment rate.

The present disclosure provides a reduced operational cost due to reduction of staff required for billing and checkout.

The present disclosure provides an increase in a number of customers served per hour in each store i.e., increased revenue per store.

The present disclosure provides an improvement in overall customer experiences and store attendance.

RESERVATION OF RIGHTS

A portion of the disclosure of this patent document contains material, which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

We claim:

1. A system for providing a computer vision assisted self-service checkout, the system comprising:
   a processor;
   a memory coupled to the processor, wherein the memory comprises processor-executable instructions, which on execution, causes the processor to:
      capture RGB and depth images of one or more products at a first timestamp using one or more Red Green Blue Depth (RGB-D) sensors mounted in an RGB-D housing frame, wherein the RGB-D housing frame comprises a rectangular framework walled at three sides and provided with diffused lighting forming an upside-down U-shaped tunnel, and wherein the rectangular framework is a 2×2 meter rectangular framework;
      combine the captured RGB and depth images to create a unified payload for the one or more products at the first timestamp;
      determine a count of the one or more products based on the unified payload of the one or more products;
      generate a unique product ID of each of the one or more products;
      identify a Stock Keeping Unit (SKU) of the one or more products based on the unique product ID of each of the one or more products; and
      generate an invoice bill for the one or more products based on the identified SKU of the one or more products.

2. The system as claimed in claim 1, wherein the one or more RGB-D sensors comprise a phone camera or a hand-held camera mounted in the RGB-D housing frame.

3. The system as claimed in claim 1, wherein the RGB-D housing frame is configured proximate to a conveyor belt.

4. The system as claimed in claim 1, wherein the processor is configured to perform a volumetric analysis to distinguish the one or more products that are visually similar but volumetrically different.

5. The system as claimed in claim 4, wherein the volumetric analysis is performed using a two-stream Convolutional Neural Network (CNN) approach.

6. The system as claimed in claim 1, wherein the unique product ID comprises a brand logo, a net weight, a Maximum Retail Price (MRP), a vegetation logo, a Food Safety and Standards Authority of India (FSSAI) mark, a Food Process Order (FPO) certification mark, and a license number of the one or more products.

7. The system as claimed in claim 1, wherein the unique product ID is generated by aggregating a brand logo, a net weight, a Maximum Retail Price (MRP), a vegetation logo, a Food Safety and Standards Authority of India (FSSAI) mark, a Food Process Order (FPO) certification mark, and a license number of the one or more products by a decision heuristics approach.

8. The system as claimed in claim 1, wherein the SKU of the one or more products is identified using a product registration database.

9. The system as claimed in claim 8, wherein the product registration database comprises the unique product ID mapped with the SKU of the one or more products created during product registration.

10. The system as claimed in claim 8, wherein the SKU of the one or more products is identified by performing a reverse search in the product registration database.

11. A method for providing a computer vision assisted self-service checkout, the method comprising:
- capturing, by a processor, RGB and depth images of one or more products at a first timestamp using one or more Red Green Blue Depth (RGB-D) sensors mounted in an RGB-D housing frame, wherein the RGB-D housing frame comprises a rectangular framework walled at three sides and provided with diffused lighting forming an upside-down U-shaped tunnel, and wherein the rectangular framework is a 2×2 meter rectangular framework;
- combining, by the processor, the captured RGB and depth images to create a unified payload for the one or more products at the first timestamp;
- determining, by the processor, a count of the one or more products based on the unified payload of the one or more products;
- generating, by the processor, a unique product ID of each of the one or more products;
- identifying, by the processor, a Stock Keeping Unit (SKU) of the one or more products based on the unique product ID of each of the one or more products; and
- generating, by the processor, an invoice bill for the one or more products based on the identified SKU of the one or more products.

12. The method as claimed in claim 11, wherein the one or more RGB-D sensors comprise a phone camera or a hand-held camera mounted in RGB-D housing frame.

13. The method as claimed in claim 11, wherein the RGB-D housing frame is configured proximate to a conveyor belt.

14. The method as claimed in claim 11, wherein the method comprises performing a volumetric analysis to distinguish the one or more products that are visually similar but volumetrically different.

15. The method as claimed in claim 14, wherein the volumetric analysis is performed using a two-stream Convolutional Neural Network (CNN) approach.

16. The method as claimed in claim 11, wherein the unique product ID comprises a brand logo, a net weight, a Maximum Retail Price (MRP), a vegetation logo, a Food Safety and Standards Authority of India (FSSAI) mark, a Food Process Order (FPO) certification mark, and a license number of the one or more products.

17. The method as claimed in claim 11, wherein the unique product ID is generated by aggregating a brand logo, a net weight, a Maximum Retail Price (MRP), a vegetation logo, a Food Safety and Standards Authority of India (FSSAI) mark, a Food Process Order (FPO) certification mark, and a license number of the one or more products by a decision heuristics approach.

18. The method as claimed in claim 11, wherein the SKU of the one or more products is identified using a product registration database.

19. The method as claimed in claim 18, wherein the product registration database comprises the unique product ID mapped with the SKU of the one or more products created during product registration.

20. The method as claimed in claim 18, wherein the SKU of the one or more products is identified by performing a reverse search in the product registration database.

21. A user equipment (UE) for providing a computer vision assisted self-service checkout, the UE comprising:
- a processor; and
- a memory coupled to the processor, wherein the memory comprises processor-executable instructions, which on execution, causes the processor to:
  - capture RGB and depth images of one or more products at a first timestamp using one or more Red Green Blue Depth (RGB-D) sensors mounted in an RGB-D housing frame, wherein the RGB-D housing frame comprises a rectangular framework walled at three sides and provided with diffused lighting forming an upside-down U-shaped tunnel, and wherein the rectangular framework is a 2×2 meter rectangular framework;
  - send the captured RGB and depth images to a system, wherein the system is configured to;
  - combine the captured RGB and depth images to create a unified payload for the one or more products at the first timestamp;
  - determine a count of the one or more products based on the unified payload of the one or more products;
  - generate a unique product ID of each of the one or more products;
  - identify a Stock Keeping Unit (SKU) of the one or more products based on the unique product ID of each of the one or more products;
  - generate an invoice bill for the one or more products based on the identified SKU of the one or more products; and
  - display the invoice bill for the one or more products based on the identified SKU for the self-service checkout.

22. The UE as claimed in claim 21, wherein the one or more RGB-D sensors comprise a phone camera or a hand-held camera mounted in the RGB-D housing frame.

* * * * *